United States Patent [19]
Clark

[11] Patent Number: 5,215,567
[45] Date of Patent: Jun. 1, 1993

[54] METHOD OF MAKING DRAPE-SHAPED GLASS ELEMENT BY SAGGING BETWEEN COLUMN SUPPORTS

[75] Inventor: Laurel Clark, Rochester Hills, Mich.

[73] Assignee: Lumen Essence Inc., Troy, Mich.

[21] Appl. No.: 676,823

[22] Filed: Mar. 29, 1991

[51] Int. Cl.$^5$ .............................. C03B 23/027
[52] U.S. Cl. ........................ 65/107; 65/273; 65/291; 264/239
[58] Field of Search ............... 65/64, 102, 107, 287, 65/289, 291, 273, 94; 264/332, 239, 294

[56] References Cited

U.S. PATENT DOCUMENTS

| | | | |
|---|---|---|---|
| 694,685 | 3/1902 | Sievert | 65/107 |
| 760,959 | 5/1900 | Connington | 65/107 |
| 1,146,910 | 7/1915 | Wiley et al. | 65/287 |
| 1,888,965 | 11/1932 | Shumann | 65/289 |
| 2,503,653 | 4/1950 | Boyles | 65/287 |
| 2,586,481 | 2/1952 | Rooksby | 65/107 |

FOREIGN PATENT DOCUMENTS 246455  6/1987  Fed. Rep. of Germany ........ 65/102

Primary Examiner—W. Gary Jones
Assistant Examiner—John M. Hoffmann

[57] ABSTRACT

A method of forming a drape-shaped glass structural element are disclosed. The element may be used as a support for a glass table top. The glass element is formed by a unique method which involves initially supporting a glass sheet on both fixed and movable members within a mold. The movable members are moved after the glass has begun to soften and move to a final shape. This causes the final glass element to have a complicated shape which cannot be formed by conventional glass forming methods.

13 Claims, 3 Drawing Sheets

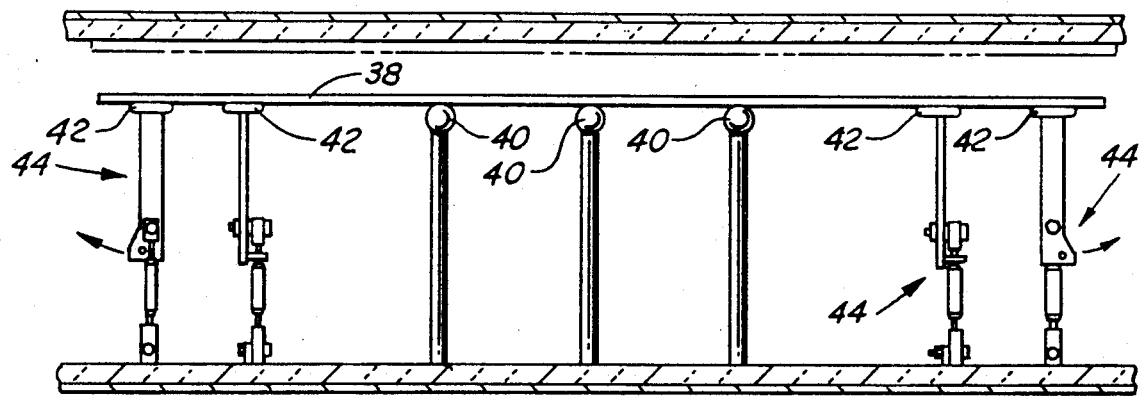
FIG.4
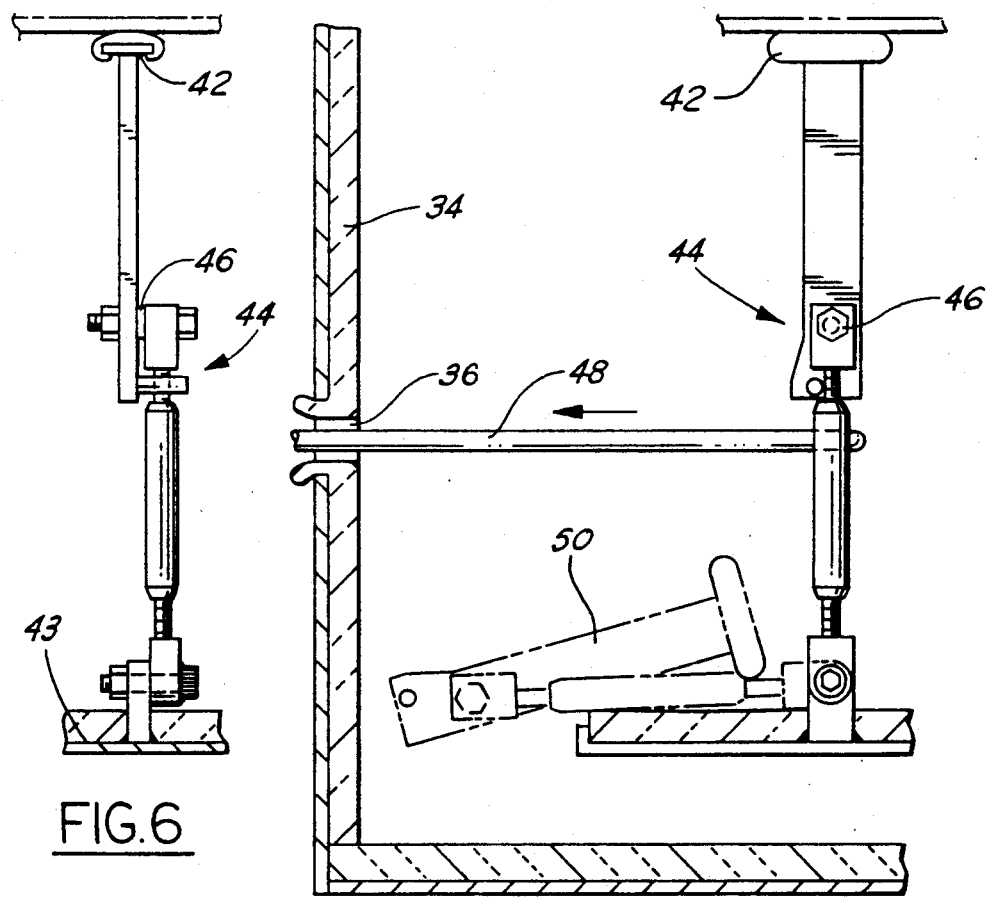
FIG.6
FIG.5

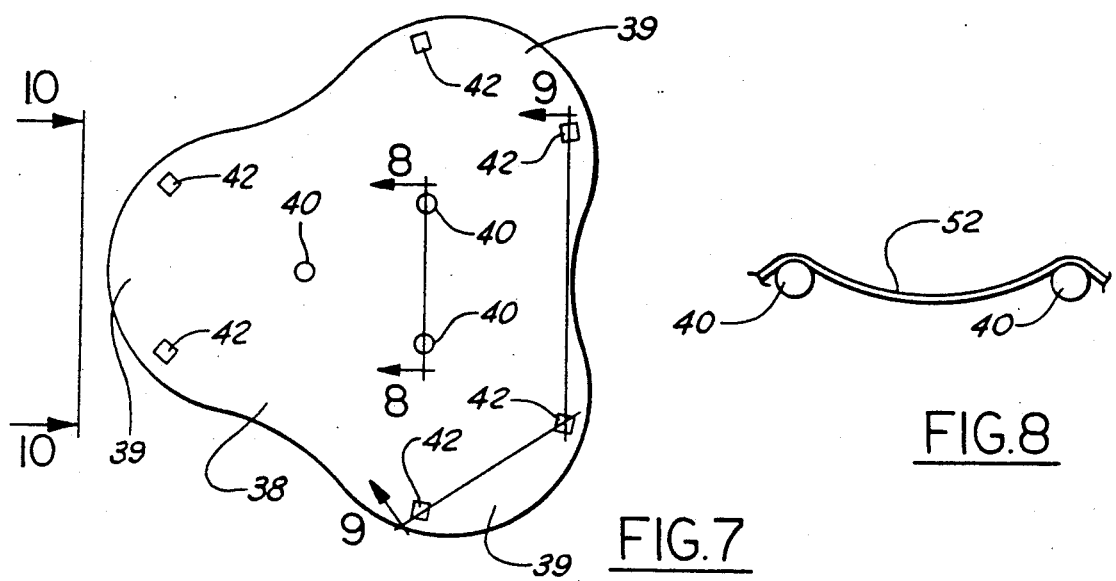
FIG.7
FIG.8
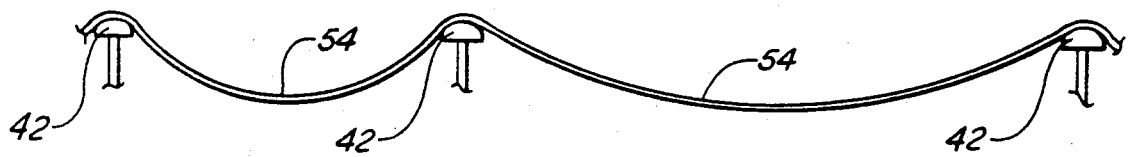
FIG.9
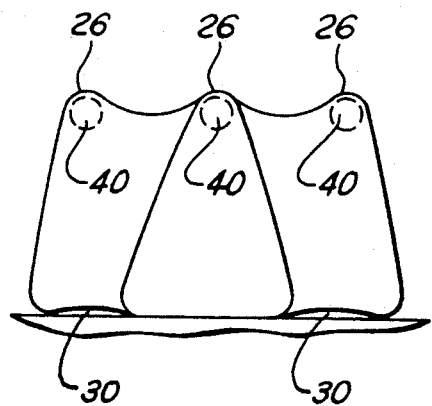
FIG.10

METHOD OF MAKING DRAPE-SHAPED GLASS ELEMENT BY SAGGING BETWEEN COLUMN SUPPORTS

BACKGROUND OF THE INVENTION

This application relates to a drape-shaped glass element which is used as a structural support for other elements, and further to a method of making such a glass element.

Various shapes of glass elements are known in the prior art. The prior art has typically not, however, used glass elements as structural supports for other members, such as a table top.

The methods of forming glass elements known in the prior art typically do not involve manipulating a heated glass member to arrive at complex final shapes. Due to this, it has been generally accepted in the glass industry that a pure glass element cannot be bent into many complex shapes, and that a glass designer is limited in the final shapes available. For this reason various other materials, such as composite plastics, have sometimes been utilized in place of glass to form complex shapes.

It is therefore an object of the present invention to disclose a method and apparatus of forming a glass sheet into a complex shape. More particularly, it is an object of the present invention to disclose a method of forming a glass element which is used as a base to support a table top.

SUMMARY OF THE INVENTION

In a disclosed embodiment of the present invention a glass element for supporting other elements is formed from a glass sheet. The glass element is drape-shaped, relatively complex and comprises a number of different curves. More preferably, the drape-shape includes plural nodes defining one vertical extent and flat surfaces at the opposed vertical extent. The flat surfaces are preferably generally parallel to support surfaces on the nodes such that the drape element is supported on the nodes and a table top is supported on the flat surfaces. Curved humps are preferably formed vertically between the nodes and the flats and give the drape element a complex shape.

In a method according to the present invention a glass sheet is initially placed within the mold and supported on both movable and fixed support members. The glass sheet becomes soft and begins to flow around both the movable and fixed support members. The movable support members are then moved out of a support position, and the glass sheet flows to a final shape. The movable support members preferably form the humps, while the fixed support members form the nodes described above.

In a preferred embodiment of the present invention three fixed support members are spaced about a central location in the mold, and a pair of movable members are associated with each fixed support member. The movable members are preferably spaced radially outwardly and circumferentially about each fixed member.

The movable members preferably pivot from a contact position where they support the glass to a retracted non-contacting position where they do not provide support. A hot box receives the entire mold, and preferably has access openings through its side such that an operator can insert a rod into the mold during heating of the glass and move the movable support members to their non-contacting position. The mold according to the present invention is also unique and allows an operator freedom in forming complex glass elements.

These and other objects and features of the present invention can be best understood from the following specification and drawings of which the following is a brief description.

BRIEF DESCRIPTION OF THE DRAWINGS

FIG. 4 is a view along line 4—4 as shown in FIG. 3.

FIG. 5 is a view along line 5—5 as shown in FIG. 3.

FIG. 6 is an enlarged partial view of a portion of the device illustrated in FIG. 5.

FIG. 7 is a top view of a drape-shaped support element being formed according to the present invention.

FIG. 8 is a cross-sectional view along line 8—8 as shown in FIG. 7.

FIG. 9 is a cross-sectional view along line 9—9 as shown in FIG. 7.

FIG. 10 is an end view along line 10—10 as shown in FIG. 7.

DETAILED DESCRIPTION OF A PREFERRED EMBODIMENT

Figure 1:
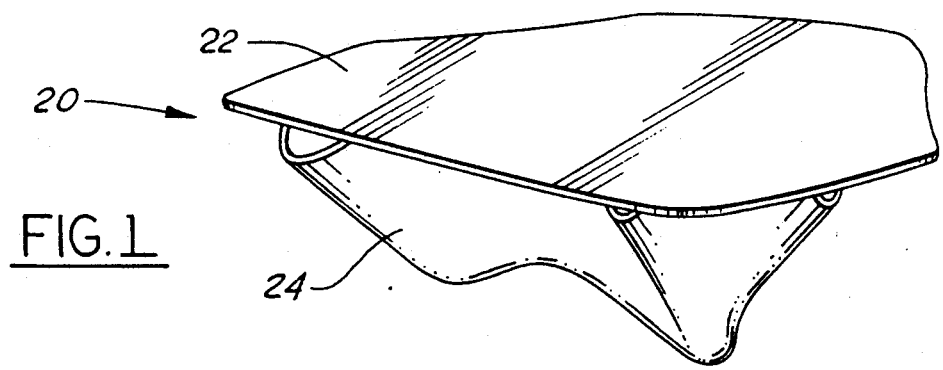
FIG. 1 is a perspective view of a glass table according to the present invention.

FIG. 1 illustrates table 20 formed entirely of glass elements. Table top 22 is formed of plate glass while a drape-shaped glass support element 24 supports the table top.

Figure 2:
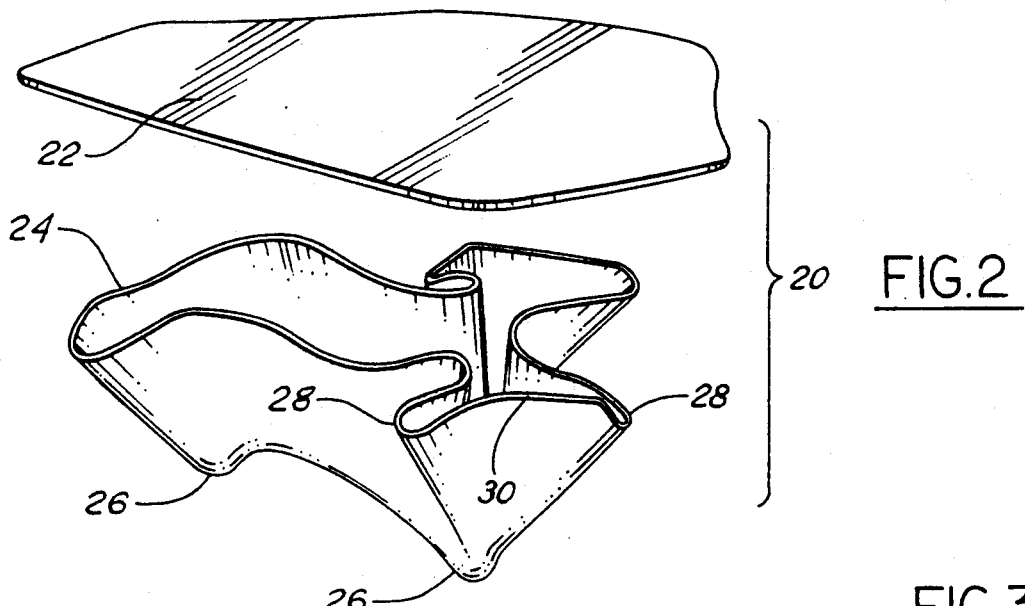
FIG. 2 is an assembly view of the glass table illustrated in FIG. 1.

As shown in FIG. 2, table top 22 is removable from drape support 24. Drape support 24 includes a plurality of nodes 26, three of which are utilized in the disclosed embodiment, which support drape element 24 on the ground. A plurality of humps 28 are formed to give element 24 a complex drape-shape. Nodes 26 define one vertical extent of drape support 24 and are curved about a vertical axis, while humps 28 are curved about axes generally skew to the curve axis of nodes 26. Two such humps 28 are associated with each node 26, although that number is in no way limiting on this invention. The several humps 28 are each curved about axes which are distinct from the others. Flats 30 are formed between each pair of humps 28 and form a support surface for table top 22. Flats 30 define the other vertical extent for drape element 24.

Figure 3:
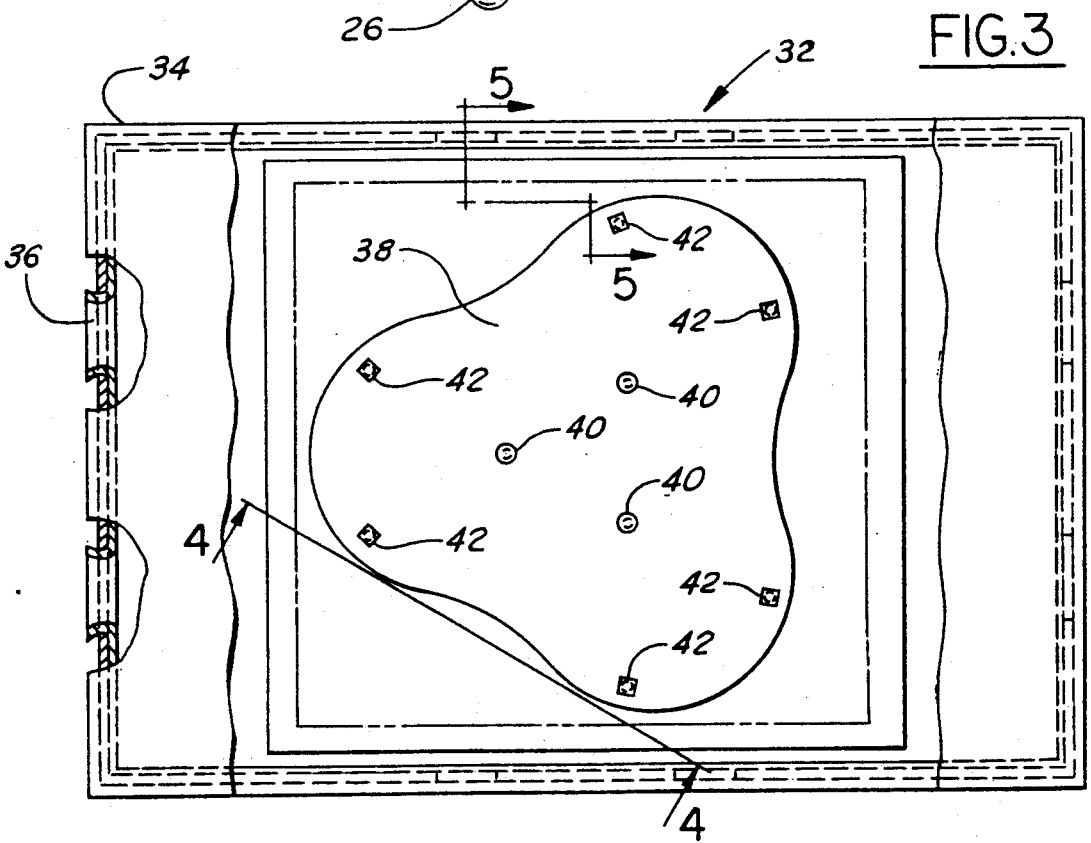
FIG. 3 is a top view of a mold for forming a glass table as illustrated in FIG. 1.

FIG. 3 shows a top view of mold 32 including hot box 34 which includes insulation and heating elements as are well known in the art. Access holes 36 extend through the wall of hot box 34 and allow an operator access to the interior of the hot box. In forming drape element 24, plate glass 38 is initially placed on a plurality of support members within hot box 34. In a disclosed embodiment three points 40 support plate 38 at central positions and form nodes 26. A plurality of props 42 are spaced radially outwardly of points 40. Two such drops 42 are spaced on opposed circumferential sides of each point 40. Props 42 form humps 28.

FIG. 4 shows an end view of the interior of hot box 34 with plate 38 supported on points 40 and props 42. Each prop 42 has prop support structure 44, which will be described below. Base 43 is defined within hot box 34, and plate 38 is supported above base 43 by members 40 and 42. The points and props are preferably covered with high-temperature resistant fabric and cushions. The props are preferably of the same height as the points.

FIG. 5 shows prop 42 being pivotable away from a contact position supporting plate glass 38. As shown, prop 42 has prop support 44 which can pivot about point 46. An element 48, which could be a rod, is inserted through access opening 36 and causes prop 42 to pivot about point 46 to a retracted position shown in phantom at 50. In position 50 prop 42 no longer provides support to plate glass 38.

FIG. 6 shows prop 42 including prop support 44 and pivot 46. Base 43 is shown below prop support 44.

FIG. 7 is a top view of plate glass 38 supported on elements 40 and 42. In forming drape element 24, plate glass 38 is initially heated within hot box 34. Plate glass 38 is cloverleaf shaped with radially outermost portions 39 between each of the pairs of props 42. As glass 38 becomes heated it begins to droop or curve vertically downwardly between members 40 and 42.

As shown in FIG. 8, the glass portion 52 between adjacent points 40 begins to curve vertically downwardly. It should be understood that all of the glass not supported on points 40 and props 42 is curving vertically downwardly at this same time.

As shown in FIG. 9, glass 54 between adjacent props 42 is also curving vertically downwardly. Humps 28 are being formed at each of the curved areas between the radially outer portions of plate glass 38 and the curves formed about props 42. At this time, the glass is curving downwardly about its entire surface, except for the nine support points illustrated in FIG. 7.

Once the glass softens and begins to droop about props 42, and humps 28 have been initially formed, rods 48 are inserted through access openings 36 and props 42 are moved to retracted position 50. When this happens the glass drops drastically vertically downwardly about nodes 26. That is, the glass is no longer supported at its radially outer portions by props 42, and those radially outer portions drop directly vertically downwardly. Humps 28 have already been formed and retain their shape in the glass as it moves downwardly.

As shown in FIG. 10, props 42 have been moved to retracted positions and glass plate 38 has moved vertically downwardly forming bends 56 adjacent to nodes 26. The outermost portions 39 of the glass between adjacent humps 28 contact base 23 and are folded into flats 30. For this reason, it is preferred that base 23 is flat. In this way the final drape-shaped glass element 24 is formed. The forming is complete when a visual inspection through the access openings indicates that the drape element 24 is in its desired shape, and no glass is level with nodes 26.

During all of this movement an operator may monitor the glass movement through openings 36. Preferably the operator prevents the glass surfaces from contacting each other while they move to the final position.

By studying drape element 24, as shown in FIG. 2 in particular, and the method of forming it as illustrated in FIGS. 7-10, the entire method can be better understood. Initially heating the glass sheet 38 forms humps 28 about each prop 42. Once props 42 are pulled to retracted positions 50, the glass drops directly downwardly around points 40 to form bends 56. Humps 28 remain in the glass and the glass continues to drop downwardly until it contacts base 23 and flats 30 are formed.

It should be understood that the element formed according to the present invention is formed with nodes 26, which are the vertically lowermost portions in use, formed as the vertically uppermost portions during the molding process. The formed drape-shaped element is then inverted and supported on nodes 26.

In one method of forming a drape shaped element, points 40 were sixteen inches tall and parallel to the floor. One-half inch thick flat glass was centered on the three points and six hinged props were placed under the flat glass. The points and props were covered with high-temperature resistant fabric and cushions, and the props were of the same height as the points. A hot box 34 was approximately 72"×84"×31" deep, and had four access holes. The hot box was actuated and the temperature elevated to approximately 1100° Fahrenheit over one hour. At this temperature the glass began to soften and curve slightly over the props. The props were then moved to retracted positions. The glass continued to drop. Steel rods covered with high temperature resistant fabric were pushed through the access openings, and used to keep the folds from contacting any other glass portion. It is preferable that the glass does not contact any other glass portions during the method of this invention.

Although a preferred embodiment of the present invention has been disclosed, a worker of ordinary skill in the art would recognize that certain modifications would come within the scope of this invention. For that reason the following claims should be studied in order to determine the true scope and content of this invention.

I claim:
1. A method of forming a glass member comprising the steps of:
   (1) supporting plate glass in a mold, said plate glass being supported on a plurality of columns, said plate glass also being supported by at least one prop;
   (2) heating the glass so that it becomes soft and unsupported portions begin to flow between said columns and said at least one prop to a final shape;
   (3) then moving said at least one prop out of contact with said plate glass such that it no longer supports the glass, while maintaining said columns of the mold in supporting contact with the glass; and
   (4) cooling the glass to form a final glass element.

2. A method as recited in claim 1, wherein the mold supports the glass at a plurality of support points defined by said at least one prop and said columns, there being a majority of the glass which remains unsupported such that the unsupported portions begin to fall vertically downwardly between those support points when the glass is heated.

3. The method as recited in claim 2, wherein the mold includes a flat bottom, and portions of the glass eventually contact the flat bottom to form flat portions on the final glass element.

4. The method as recited in claim 1, wherein the movement of step (3) includes pivoting at least one movable prop to a retracted position where it no longer supports the glass.

5. The method as recited in claim 4, wherein the mold includes a hot box which generally encloses the glass and support portions, and wherein the hot box has at least one access hole and a rod is inserted into the access hole to cause the movable prop to pivot.

6. The method as recited in claim 1, wherein said plurality of columns are not moved and continue to support the glass after step (3) and there is a plurality of said movable props which are moved in step (3).

7. The method as recited in claim 6, wherein the movement of the movable props occurs after the glass has begun to soften and has begun to flow downwardly around the movable props.

8. The method as recited in claim 1, wherein there are three central fixed columns, and a pair of movable props associated with each fixed column, the movable props being spaced radially outwardly of the fixed columns and circumferentially spaced on opposed sides of the fixed columns.

9. The method as recited in claim 8, wherein the plate is cloverleaf in shape with radially outermost portions circumferentially aligned with each pair of movable props.

10. The method as recited in claim 1, wherein an operator has access to the interior of the mold and ensures that the glass surfaces does not contact other glass surfaces during the molding operation.

11. A method as recited in claim 1, wherein there are plurality of said columns spaced circumferentially about a center of said plate glass, and said at least one prop being positioned radially outwardly of said columns.

12. The method as recited in claim 11, wherein there are two of said props for each said column, with said props being spaced on each circumferential side of said column radially outwardly of said column.

13. The method as recited in claim 1, wherein said at least one prop is moved vertically downwardly away from said plate glass in step (3).

* * * * *